United States Patent [19]

Brandt

[11] 4,165,853
[45] Aug. 28, 1979

[54] MOUNTING BRACKET FOR SOLAR HEAT COLLECTOR

[76] Inventor: Richard F. Brandt, 10 South St., Red Bank, N.J. 07701

[21] Appl. No.: 869,910

[22] Filed: Jan. 16, 1978

[51] Int. Cl.² .................... A47G 29/02; E04G 3/08
[52] U.S. Cl. ............................ 248/237; 248/354 R
[58] Field of Search ............ 248/237, 274, 276, 278, 248/279, 282, 284, 285, 286, 354 R, 148; 165/DIG. 15

[56] References Cited
U.S. PATENT DOCUMENTS

| | | | |
|---|---|---|---|
| 903,499 | 11/1908 | Pierce | 248/278 X |
| 1,439,511 | 12/1922 | Genn | 248/278 UX |
| 2,721,631 | 10/1955 | Honold | 248/284 X |
| 3,333,802 | 8/1967 | Goodman | 248/237 X |
| 3,356,330 | 12/1967 | Rambelle | 248/354 R |
| 3,829,153 | 8/1974 | Fussell et al. | 248/279 X |
| 4,074,883 | 2/1978 | Daly et al. | 248/279 X |

Primary Examiner—J. Franklin Foss

[57] ABSTRACT

Apparatus for mounting a solar collector to a mounting surface which permits the solar collector to maintain a predetermined orientation with respect to the position of the sun notwithstanding variation in slope and orientation of the mounting surface.

5 Claims, 4 Drawing Figures

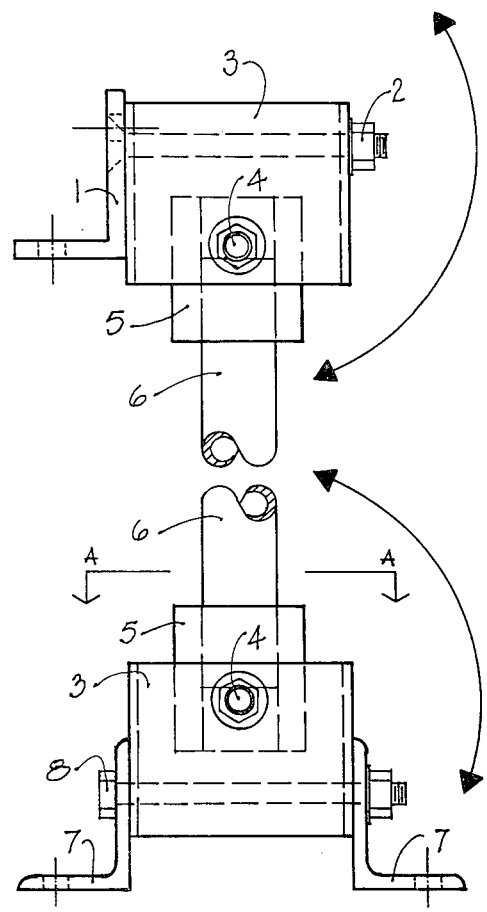
FIG. 1
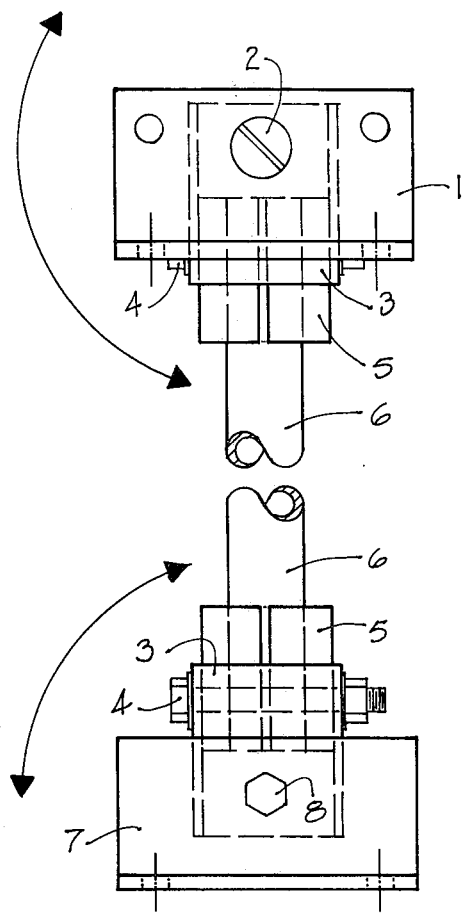
FIG. 2
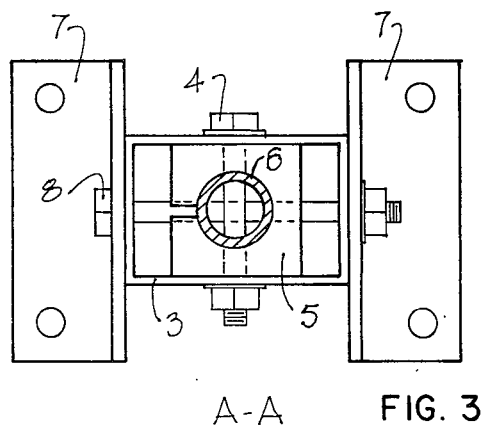
A-A  FIG. 3
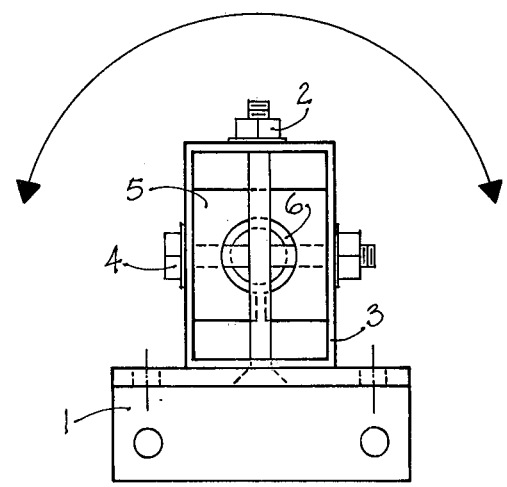
FIG. 4

MOUNTING BRACKET FOR SOLAR HEAT COLLECTOR

FIELD OF THE INVENTION

This invention relates to mounting apparatus and more particularly to apparatus for mounting a solar collector on a surface.

BACKGROUND OF THE INVENTION

Fossil fuels have in the past provided the bulk of the world's energy needs. However, as the price of fossil fuels has increased and their supply decreased, increasing attention has been directed towards the development of alternate energy sources. One such alternate energy source is the solar collector which utilizes the energy from the sun to heat a transfer medium. The transfer medium is in turn circulated throughout a structure in various well-known ways to provide a heat source for the structure.

In order to achieve maximum efficiency from a solar collector, it is necessary that the solar collector be orientated in a predetermined position with respect to the position of the sun. It is, of course, appreciated that solar collectors are typically mounted on the roof of the structure to be heated and that roof slope and orientation may vary greatly from one structure to another. Therefore, it is imperative that the mounting apparatus utilized to mount a solar collector be adaptable so that solar collector orientation with respect to the position of the sun can be maintained notwithstanding changes in roof slope and orientation.

It is, therefore, an object of this invention to provide solar collector mounting apparatus which will maintain solar collector orientation in a predetermined position with respect to the sun notwithstanding changes in mounting surface slope and orientation.

It is a further object of this invention to provide solar collector mounting apparatus which is inexpensive, readily manufactured and easily used.

SUMMARY OF THE INVENTION

In accordance with a first feature of the invention solar collector mounting apparatus includes a stem member interposed between the solar collector and the mounting surface and a detachable connection between the solar collector and an upper end of the stem member to provide vertical movement of said solar collector relative to said stem member, rotational movement of said solar collector in a first vertical plane relative to said stem member and rotational movement of said solar collector in a second vertical plane relative to said stem member, said first vertical plane relative to said stem member being perpendicular to said second vertical plane relative to said stem member.

In accordance with another feature of the invention a second detachable connection exists between a lower end of the stem member and the mounting surface to provide rotational movement of said stem member in a horizontal plane relative to said surface, rotational movement of said stem member in a first vertical plane relative to said surface and rotational movement of said stem member in a second vertical plane relative to said surface, said first vertical plane relative to said surface being perpendicular to said second vertical plane relative to said surface.

The foregoing and other objects and features of this invention will be more fully understood from the following description of an illustrative embodiment thereof taken in conjunction with the accompanying drawings.

BRIEF DESCRIPTION OF THE DRAWINGS

In the drawings:

FIG. 1 illustrates a side view of solar collector mounting apparatus in accordance with the invention, FIG. 2 illustrates a front view of solar collector mounting apparatus in accordance with the invention, FIG. 3 illustrates a sectional view of FIG. 1 along the lines A—A, and FIG. 4 illustrates a top view of solar collector mounting apparatus in accordance with the invention.

DETAILED DESCRIPTION

Refer to FIG. 1. Solar collector mounting bracket 1 is a ship angle preferably, four inches long with four apertures in the lower surface thereof to be used in fastening a solar collector to the mounting bracket. Aperture 2 receives a flat head bolt with a lock washer and nut assembly to attach bracket 1 to bracket 3. This pinned connection at 2 permits the solar collector connected to mounting bracket 1 to rotate in a vertical plane relative to stem member 7 as shown in FIG. 2. Bracket 3 is bolted by two hex head bolts with lock washer and nut assemblies 4 for a friction fastening to element 5. Element 5 has threaded holes (FIG. 4) to receive bolts 4 and a drilled out hole 6 provided for drilling into stem member 7 once assembly in the field is completed and the connection can be pinned. Element 5 has bored therein an aperture to receive stem member 7 preferably having a 1" outside diameter and a 3/16" wall thickness. The solar collector connected to element 1 can thus rotate in a vertical plane relative to said stem member as shown in FIG. 1 and can also be moved in a vertical direction relative to said stem member until tightening of the hex head bolt-nut assembly 4 and pinning 6. Stem member 7 is of varying lengths depending on the desired distance between the solar collector and the mounting surface.

Stem member 7 Is connected at its base to the mounting surface. Stem member 7 fits into a length of aluminum stock 8 that has bored therein an aperture to receive stem member 7. An aperture is also provided for a pinnint 13. This assembly permits rotation of said stem member in a horizontal plane relative to the mounting surface as shown in FIG. 3. Stock section 8 is fastened to a box section 9 with a hex head bolt and lock washer and nut assembly. Stem member 7 rests on bolt 10. This connection permits rotation of stem member 7 in a vertical plane relative to the mounting surface as is shown in FIG. 1. Rotation is prohibited when bolt and nut assembly (10) is tightened.

Box section 9 is fastened to two structural angles 11 by a hex head bolt with lock washer and nut assembly 12. This connection permits rotation of stem member 7 in a second vertical plane relative to the mounting surface as shown in FIG. 2 until the connection is tightened. Each structural angle 11 is provided with two apertures for easy mounting to the mounting surface.

Although a specific embodiment of this invention has been shown and described, it will be understood that various modifications may be made without departing from the spirit of this invention.

I claim:

1. Apparatus for mounting a solar collector on a surface comprising a stem member interposed between said surface and said solar collector, first means detachably connecting said solar collector to an upper end of said stem member in a manner permitting vertical movement of said solar collector relative to said stem member, rotational movement of said solar collector in a first vertical plane relative to said stem member and rotational movement of said solar collector in a second vertical plane relative to said stem member, said first vertical plane relative to said stem member being perpendicular to said second vertical plane relative to said stem member, and second means detachably connecting a lower end of said stem member to said surface in a manner permitting rotational movement of said stem member in a horizontal plane relative to said surface, rotational movement of said stem member in a first vertical plane relative to said surface and rotational movement of said stem member in a second vertical plane relative to said surface, said first vertical plane relative to said surface being perpendicular to said second vertical plane relative to said surface.

2. Apparatus in accordance with claim 1 wherein said first and second means include means for arresting the movement of said solar collector and said stem member in a plurality of fixed positions.

3. Apparatus in accordance with claim 1 wherein said stem member comprises an elongated tube.

4. Apparatus in accordance with claim 2 wherein said arresting means comprises a bolt threadably engaged with a locking nut.

5. Apparatus in accordance with claim 1 wherein said stem member length varies in response to the distance required between said solar collector and said surface.

* * * * *